US012802287B2

(12) United States Patent
Yin et al.

(10) Patent No.: US 12,802,287 B2
(45) Date of Patent: *Nov. 17, 2026

(54) ONE-STEP DIFFUSION WITH DISTRIBUTION MATCHING DISTILLATION

(71) Applicant: ADOBE INC., San Jose, CA (US)

(72) Inventors: Tianwei Yin, Cambridge, MA (US); Michaël Gharbi, San Francisco, CA (US); Richard Zhang, Burlingame, CA (US); Elya Shechtman, Seattle, WA (US); Taesung Park, Sunnyvale, CA (US)

(73) Assignee: ADOBE INC., San Jose, CA (US)

( * ) Notice: Subject to any disclaimer, the term of this patent is extended or adjusted under 35 U.S.C. 154(b) by 153 days.

This patent is subject to a terminal disclaimer.

(21) Appl. No.: 18/639,301

(22) Filed: Apr. 18, 2024

(65) Prior Publication Data

US 2025/0329061 A1 Oct. 23, 2025

(51) Int. Cl.

| | |
|---|---|
| ***G06T 5/00*** | (2024.01) |
| ***G06T 5/60*** | (2024.01) |
| ***G06T 5/70*** | (2024.01) |
| ***G06T 11/00*** | (2006.01) |

(52) U.S. Cl.
CPC .................................... *G06T 11/00* (2013.01)

(58) Field of Classification Search
CPC ................ G06T 5/00; G06T 5/60; G06T 5/70
See application file for complete search history.

(56) References Cited

U.S. PATENT DOCUMENTS

2022/0198266 A1* 6/2022 Chakraborty .......... G06N 3/047
2023/0245285 A1* 8/2023 Dinh ......................... G06T 5/90
382/274
2023/0377226 A1* 11/2023 Saharia .................... G06N 3/08
2024/0303780 A1* 9/2024 Hu ....................... A61B 6/5258
2026/0099957 A1* 4/2026 Chen ....................... G06T 11/00

OTHER PUBLICATIONS

2Goodfellow, et al., "Generative Adversarial Nets". arXiv preprint arXiv:1406.2661v1 [stat.ML] Jun. 10, 2014, 9 pages.
1Ho, et al., "Denoising Diffusion Probabilistic Models", arXiv preprint arXiv:2006.11239v2 [cs.LG] Dec. 16, 2020, 25 pages.
3Karras, et al., "Elucidating the Design Space of Diffusion-Based Generative Models", arXiv preprint arXiv:2206.00364v2 [cs.CV] Oct. 11, 2022, 47 pages.
4Berthelot, et al. "Tract: Denoising Diffusion Models with Transitive Closure Time-Distillation", arXiv preprint arXiv:2303.04248v1 [cs.LG] Mar. 7, 2023, 18 pages.

(Continued)

*Primary Examiner* — Yi Yang
(74) *Attorney, Agent, or Firm* — F. CHAU & ASSOCIATES, LLC

(57) ABSTRACT

A method, apparatus, non-transitory computer readable medium, apparatus, and system for image generation include obtaining a text prompt and a noise input, and then generating a synthetic image based on the text prompt and the noise input by performing a single pass with an image generation model. The image generation model is trained based on a multi-term loss comprising a positive term based on an output of a pre-trained model, and a negative term based on an output of a jointly-trained model.

20 Claims, 9 Drawing Sheets

(56) References Cited

OTHER PUBLICATIONS

5Luhman, et al., "Knowledge Distillation in Iterative Generative Models for Improved Sampling Speed", arXiv:2101.02388v1 [cs. LG] Jan. 7, 2021, 20 pages.
6Song, et al., "Generative Modeling by Estimating Gradients of the Data Distribution", arXiv preprint arXiv:1907.05600v3 [cs.LG] Oct. 10, 2020, 23 pages.
7Wang, et al. "ProlificDreamer: High-Fidelity and Diverse Text-to-3D Generation with Variational Score Distillation", arXiv preprint arXiv:2305.16213v2 [cs.LG] Nov. 22, 2023, 36 pages.
8Wang, et al., "Diffusion-GAN: Training GANs with Diffusion", arXiv preprint arXiv:2206.02262v4 [cs.LG] Aug. 25, 2023 (26 pages).

* cited by examiner

ONE-STEP DIFFUSION WITH DISTRIBUTION MATCHING DISTILLATION

BACKGROUND

The following relates generally to image processing, and more specifically to image generation. Image processing is a type of data processing that involves the manipulation of an image to get the desired output, typically utilizing specialized algorithms and techniques. Image generation is a type of image processing that involves the creation of synthetic images. Generative AI has been increasingly integrated into creative workflows, providing a transformative impact on industries ranging from digital art and design to entertainment and advertising. Image generation is one application of generative AI. Text-to-image generation aims to generate images from text descriptions. Recent advances in generative architectures have yielded Denoising Diffusion Probabilistic Models (DDPMs) for image generation. DDPMs generate samples by transforming an initial random noise distribution into a data distribution over a series of time steps. In some cases, a DDPM can be conditioned on a text description, such that the diffusion process generates images that match the text.

SUMMARY

Embodiments of the inventive concepts described herein include systems and methods for generating images using a one-step image generation model. The one-step image generation model is trained using a multi-term loss derived from a gradient network including a pre-trained multi-step model and a jointly-trained multi-step model. The jointly-trained model, unlike the pre-trained model with fixed parameters, is trained to perform reverse diffusion on synthetic images generated by the one-step model. This training approach allows the jointly-trained model to represent "fakeness" in its denoising output, contrasting with the pre-trained model's retained denoising knowledge. The subtraction of outputs from these multi-step models yields a gradient signal that guides the one-step generator towards the output distribution of the pre-trained parent model and away from the distribution of the jointly-trained model, enabling the generation of high-quality images in a single iteration.

A method, apparatus, non-transitory computer readable medium, and system for image generation are described. One or more aspects of the method, apparatus, non-transitory computer readable medium, and system include obtaining a text prompt and a noise input; and generating, using an image generation model, a synthetic image based on the text prompt and noise input by performing a single pass with the image generation model, wherein the image generation model is trained based on a multi-term loss comprising a positive term based on an output of a pre-trained model, and a negative term based on an output of a jointly-trained model.

A method, apparatus, non-transitory computer readable medium, and system for image generation are described. One or more aspects of the method, apparatus, non-transitory computer readable medium, and system include initializing an image generation model; computing a multi-term loss comprising a positive term based on an output of a pre-trained model, and a negative term based on an output of a jointly-trained model; and training the image generation model to generate a synthetic image in a single pass based on the multi-term loss.

An apparatus, system, and method for image generation are described. One or more aspects of the apparatus, system, and method include at least one processor; at least one memory storing instructions executable by the at least one processor; and an image generation model comprising parameters stored in the at least one memory and trained to perform a single pass to obtain a synthetic image based on a noise input, wherein the image generation model is trained based on a multi-term loss comprising a positive term based on an output of a pre-trained model, and a negative term based on an output of a jointly-trained model.

DETAILED DESCRIPTION

Figure 1:
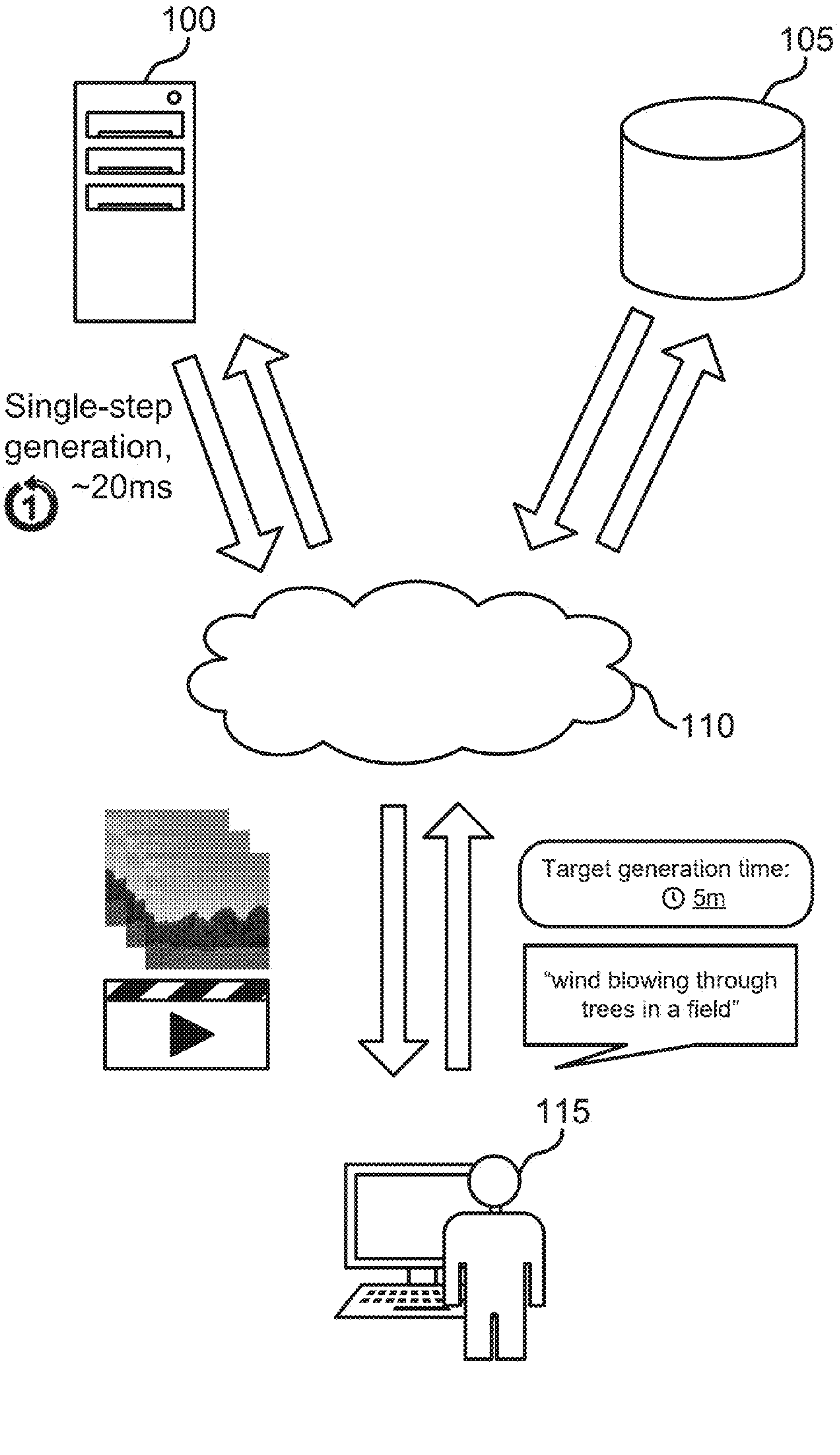
FIG. 1 shows an example of an image generation system according to aspects of the present disclosure.

Image generation is frequently used in creative workflows. Historically, users would rely on manual techniques and drawing software to create visual content. The advent of machine learning (ML) has enabled new workflows that automate the image creation process.

ML is a field of data processing that focuses on building algorithms capable of learning from and making predictions or decisions based on data. It includes a variety of techniques, ranging from simple linear regression to complex neural networks, and plays a significant role in automating and optimizing tasks that would otherwise require extensive human intervention.

Generative models in ML are algorithms designed to generate new data samples that resemble a given dataset. Generative models are used in various fields, including image generation. They work by learning patterns, features, and distributions from a dataset and then using this understanding to produce new, original outputs. This ability to predict or simulate makes them invaluable for tasks where new content creation is desired.

Many approaches have been employed to create models that can synthesize images. One approach is Generative Adversarial Networks (GANs), which involve training two neural networks against each other to produce high-quality, realistic images. Another approach is Variational Autoencoders (VAEs), which are effective for generating new images while ensuring that they are varied and different from the training dataset. Additionally, Convolutional Neural Networks (CNNs) have been adapted for image generation, capitalizing on their ability to capture spatial hierarchies in image data.

Recently, denoising diffusion probability models (DDPMs) have been used to generate images. These models work by initially adding noise to an image and then learning to reverse this process. The model gradually transforms a sample of random noise into a coherent image, learning to denoise through a series of steps. Diffusion models have remained the state of the art for generating highly detailed, realistic images. However, conventional diffusion models use several iterations in their generative process, often totaling thousands of milliseconds at inference time. This prohibits such models from being used in an interactive manner.

There are some conventional approaches for reducing the size and compute resources for diffusion models, especially at inference time. Some methods include architecting fast samplers that can reduce the number of iterations from 1000 to fewer than 100. However, further reductions in the number of iterations often results in a catastrophic decrease in performance. Even as few as 10s of iterations per generation are prohibitively slow for interactivity. Others have attempted to create a one-step generator using a sample-matching approach. The sample-matching approach attempts align the outputs of the parent model and the student model exactly, and uses regression loss that trains the model to learn the full-denoising trajectory from noise-image pairs. In other words, the trained model learns the exact mapping from a given noise sample to its corresponding image. However, outside of the training images, the models tend to output broken images with unnatural visual features, especially when conditioned with a text prompt.

In contrast, the present embodiments include an image generation model capable of performing fast and accurate one-step image generation. Embodiments are configured to perform this stable, one-step transformation through a training method based on a distribution-matching loss, which guides the image generation model to produce images in the same distribution as a pre-trained, multi-step parent generation model. This distribution-matching approach leads to more stable outputs, even when the model is given complex guidance features such as from text prompts.

The distribution-matching loss includes a first term from the parent model, and a second term from an unlocked and jointly-trained model. As used herein, the first term may be referred to as a "positive term," and the second term may be referred to as a "negative term," due to the way the two terms are combined. This multi-term loss guides the one-step image generation model towards the distribution of the pre-trained model by minimizing the divergence between their respective output distributions. The use of the multi-term loss provides an information-rich learning vector for training the one-step generation model, in contrast to, e.g., a binary classification as used in GAN-based training regimes. The image generation model retains its high-quality, realistic generation ability even when used for text-to-image generation. Accordingly, embodiments improve upon conventional image generation models in speed and accuracy by enabling the generation of condition-aligned, high quality, and diverse images in a single step, thereby greatly reducing the inference time and allowing real-time user interaction.

As used herein, "one-step" or "single pass" generation excludes multi-iteration generation, such as the generation performed by conventional diffusion models. An image generation system is described with reference to FIGS. 1-3. Methods for training an image generation model are described with reference to FIGS. 4-5. Methods for generating synthesized images are described with reference to FIGS. 6-8. A computing device configured to implement an image generation apparatus is described with reference to FIG. 9.

Image Generation System

An apparatus for image generation is described. One or more aspects of the apparatus include at least one processor; at least one memory storing instructions executable by the at least one processor; and an image generation model comprising parameters stored in the at least one memory and trained to perform a single pass to obtain a synthetic image based on a noise input, wherein the image generation model is trained based on a multi-term loss comprising a positive term based on an output of a pre-trained model, and a negative term based on an output of a jointly-trained model. Some examples of the apparatus, system, and method further include a text encoder configured to generate guidance input for the image generation model based on a text prompt, wherein the synthetic image includes an element based on the text prompt.

In some aspects, the image generation model comprises a U-Net architecture. In some aspects, the pre-trained model comprises a diffusion model. In some aspects, the jointly-trained model comprises a diffusion model. In some aspects, the image generation model is initialized using weights from the pre-trained model. In some aspects, the jointly-trained model is initialized using weights from the pre-trained model.

FIG. 1 shows an example of an image generation system according to aspects of the present disclosure. The example shown includes image generation apparatus 100, database 105, network 110, and user 115.

In an example process, user 115 provides a prompt via user interface. The prompt may be a description of an image the user wishes to generate. Then, image generation apparatus 100 generates an image based on the prompt, and provides the image back to the user via the user interface. The image generation apparatus 100 may generate images using a one-step image generation model, and the generated image may have quality comparable to a pre-trained, multi-step image generation model. Accordingly, embodiments can provide newly generated images with as low as 20 ms latency, enabling real-time interactivity. For example, the prompt may include a drawable input portion, and the generated image may be continuously output as the user draws.

Image generation apparatus 100 is configured to generate high-quality images in a single pass. Embodiments of image generation apparatus 100 are implemented on a server. A server provides one or more functions to users linked by way of one or more of the various networks 110. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a super computer, or any other suitable processing apparatus. Image generation apparatus 100 is an example of, or includes aspects of, the corresponding element described with reference to FIG. 2.

Database 105 stores information used by image generation apparatus 100. Examples of such information include model parameters, training data, user profile data, historical interactions, configuration data, and the like. A database is an organized collection of data. For example, a database stores data in a specified format known as a schema. A database may be structured as a single database, a distributed database, multiple distributed databases, or an emergency backup database. In some cases, a database controller may manage data storage and processing in the database. In some cases, a user 115 interacts with the database controller. In other cases, the database controller may operate automatically without user interaction.

Network 110 is configured to transfer information between image generation apparatus 100, database 105, and user 115. In some cases, network 100 is referred to as a "cloud." A cloud is a computer network configured to provide on-demand availability of computer system resources, such as data storage and computing power. In some examples, the cloud provides resources without active management by the user. The term cloud is sometimes used to describe data centers available to many users over the Internet. Some large cloud networks have functions distributed over multiple locations from central servers. A server is designated an edge server if it has a direct or close connection to a user. In some cases, a cloud is limited to a single organization. In other examples, the cloud is available to many organizations. In one example, a cloud includes a multi-layer communications network 110 comprising multiple edge routers and core routers. In another example, a cloud is based on a local collection of switches in a single physical location.

Figure 2:
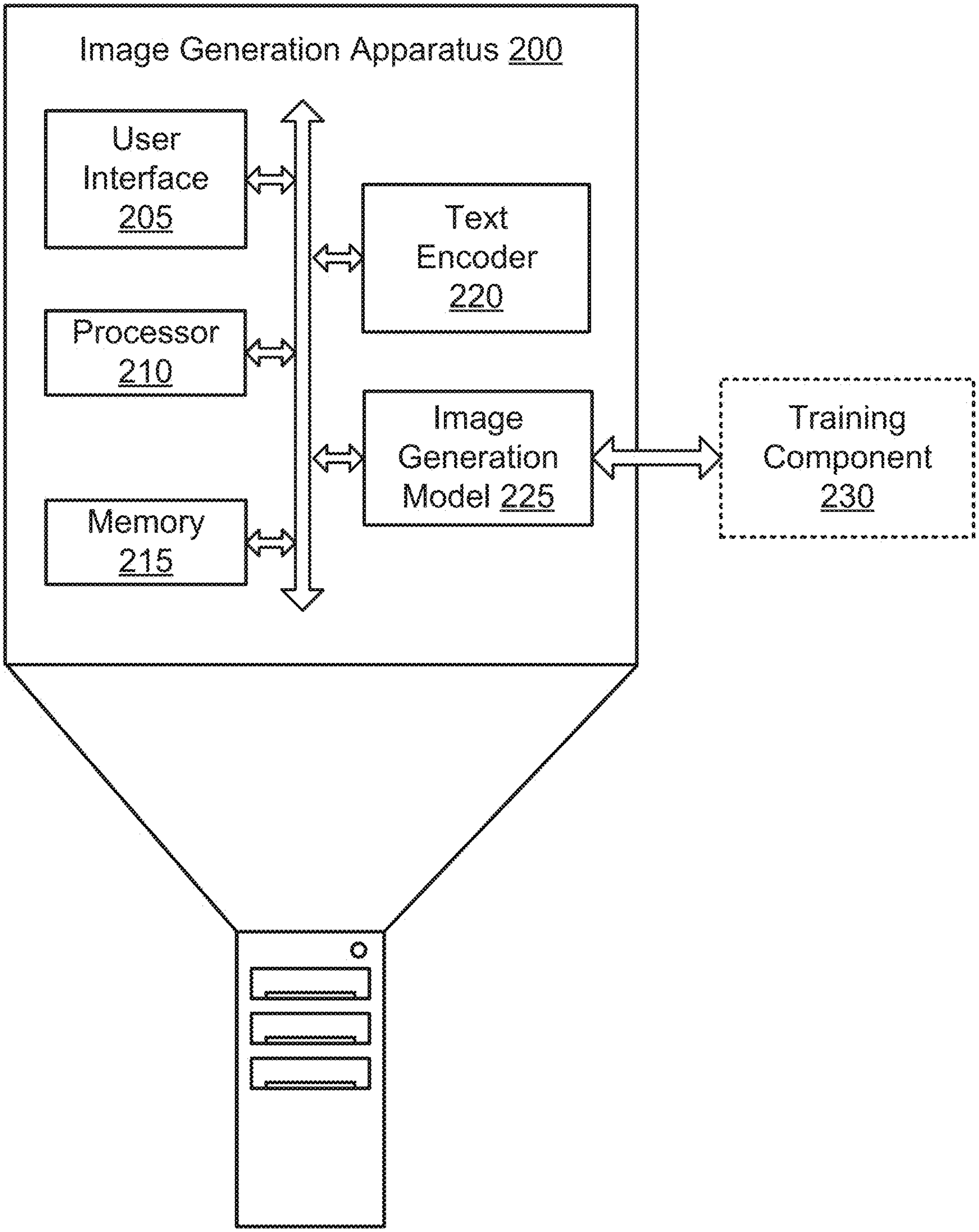
FIG. 2 shows an example of an image generation apparatus according to aspects of the present disclosure.

FIG. 2 shows an example of an image generation apparatus 200 according to aspects of the present disclosure. The example shown includes image generation apparatus 200, user interface 205, processor 210, memory 215, text encoder 220, image generation model 225, and training component 230. Image generation apparatus 200 is an example of, or includes aspects of, the corresponding element described with reference to FIG. 1.

A user interface 205 may enable a user to interact with a device. In some embodiments, the user interface 205 may include an audio device, such as an external speaker system, an external display device such as a display screen, or an input device (e.g., remote control device interfaced with the user interface 205 directly or through an IO controller module). In some cases, a user interface 205 may be a graphical user interface 205 (GUI). For example, the GUI may include input elements to allow a user to enter a prompt, such as a text prompt or other type of conditioning, including but not limited to: depth images, sketches, reference images, and the like.

A processor 210 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, processor 210 is configured to operate a memory 215 using a memory controller. In other cases, a memory controller is integrated into processor 210. In some cases, processor 210 is configured to execute computer-readable instructions stored in memory 215 to perform various functions. In some embodiments, processor 210 includes special purpose components for modem processing, baseband processing, digital signal processing, or transmission processing.

Memory 215 stores data as well as instructions executable by processor 210. Examples of a memory device include random access memory (RAM), read-only memory (ROM), or a hard disk. Examples of memory devices include solid state memory and a hard disk drive. In some examples, memory 215 is used to store computer-readable, computer-executable software including instructions that, when executed, cause a processor 210 to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

Components of image generation apparatus 200, such as text encoder 220, image generation model 225, and models used during training, include machine learning (ML) components such as artificial neural networks (ANNs). An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. In some examples, nodes may determine their output using other mathematical algorithms (e.g., selecting the max from the inputs as the output) or any other suitable algorithm for activating the node. Each node and edge is associated with one or more node weights that determine how the signal is processed and transmitted.

During the training process, these weights are adjusted to improve the accuracy of the result (i.e., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

Text encoder 220 is used to convert an input text into an embedding that can be used to guide the image generation process. An embedding is a numerical vector representation of the input text. This embedding is generated by text encoder 220 and captures the semantic meaning of the text. The process involves transforming the words and phrases of the input text into a high-dimensional space where similar meanings are represented by vectors that are close to each other in the space. Embodiments of text encoder 220 include a transformer-based encoder, such as Flan-T5 or the text encoder of the CLIP network.

Contrastive Language-Image Pre-Training (CLIP) is a neural network that is trained to efficiently learn visual concepts from natural language supervision. CLIP can be instructed in natural language to perform a variety of classification benchmarks without directly optimizing for the benchmarks' performance, in a manner building on "zero-shot" or zero-data learning. CLIP can learn from unfiltered, highly varied, and highly noisy data, such as text paired with images found across the Internet, in a similar but more efficient manner to zero-shot learning, thus reducing the need for expensive and large labeled datasets. A CLIP model can be applied to nearly arbitrary visual classification tasks so that the model may predict the likelihood of a text description being paired with a particular image, removing the need for users to design their own classifiers and the need for task-specific training data. For example, a CLIP model can be applied to a new task by inputting names of the task's visual concepts to the model's text encoder. The model can then output a linear classifier of CLIP's visual representations. Text encoder 220 is an example of, or includes aspects of, the corresponding element described with reference to FIGS. 3 and 6.

Image generation model 225 generates synthetic images in a single pass. As used herein, "single pass" refers to the ability of the model to transform a pure noise input to a realistic output image, with no noise, in a single denoising step. Embodiments of image generation model 225 include a feed-forward convolutional neural network (CNN) architecture, such as a U-Net. The U-Net design is described with reference to FIG. 3. The training process for image generation model 225 that enables the model to generate the images in a single pass is described in detail with reference to FIG. 4.

According to some aspects, image generation model 225 performs a single pass with an image generation model 225 to obtain a synthetic image based on a noise input, where the image generation model 225 is trained based on a multi-term loss including a positive term based on an output of a pre-trained model, and a negative term based on an output of a jointly-trained model. In some examples, image generation model 225 encodes the noise input to obtain a hidden representation including fewer dimensions than the noise input. In some examples, image generation model 225 decodes the hidden representation to obtain the synthetic image. In some aspects, the image generation model 225 is initialized using weights from the pre-trained model. Image generation model 225 is an example of, or includes aspects of, the corresponding element described with reference to FIGS. 4 and 6.

Training component 230 is configured to update parameters of image generation model 225 during a training process. Embodiments of training component 230 update the parameters of image generation model 225 by backpropagating a loss function, such as the multi-term loss. In some embodiments, training component 230 is further configured to generate training data, such as noise and image pairs. For example, training component 230 may generate the noise and image pairs by instructing a pre-trained, multi-step model to perform forward and reverse diffusion processes.

According to some aspects, training component 230 trains the image generation model 225 to generate a synthetic image in a single pass based on the multi-term loss. In some examples, training component 230 trains a jointly-trained model based on an output of the image generation model 225. In some examples, training component 230 creates a training set including a noise input and a training output. In some examples, training component 230 computes a regression loss based on the training output and an output of the image generation model 225, where the output of the image generation model 225 is based on the noise input. In at least one embodiment, training component 230 is implemented on an apparatus different from image generation apparatus 200. The training process, including the use of the jointly-trained model and the pre-trained model, is described in detail with reference to FIG. 4.

Figure 3:
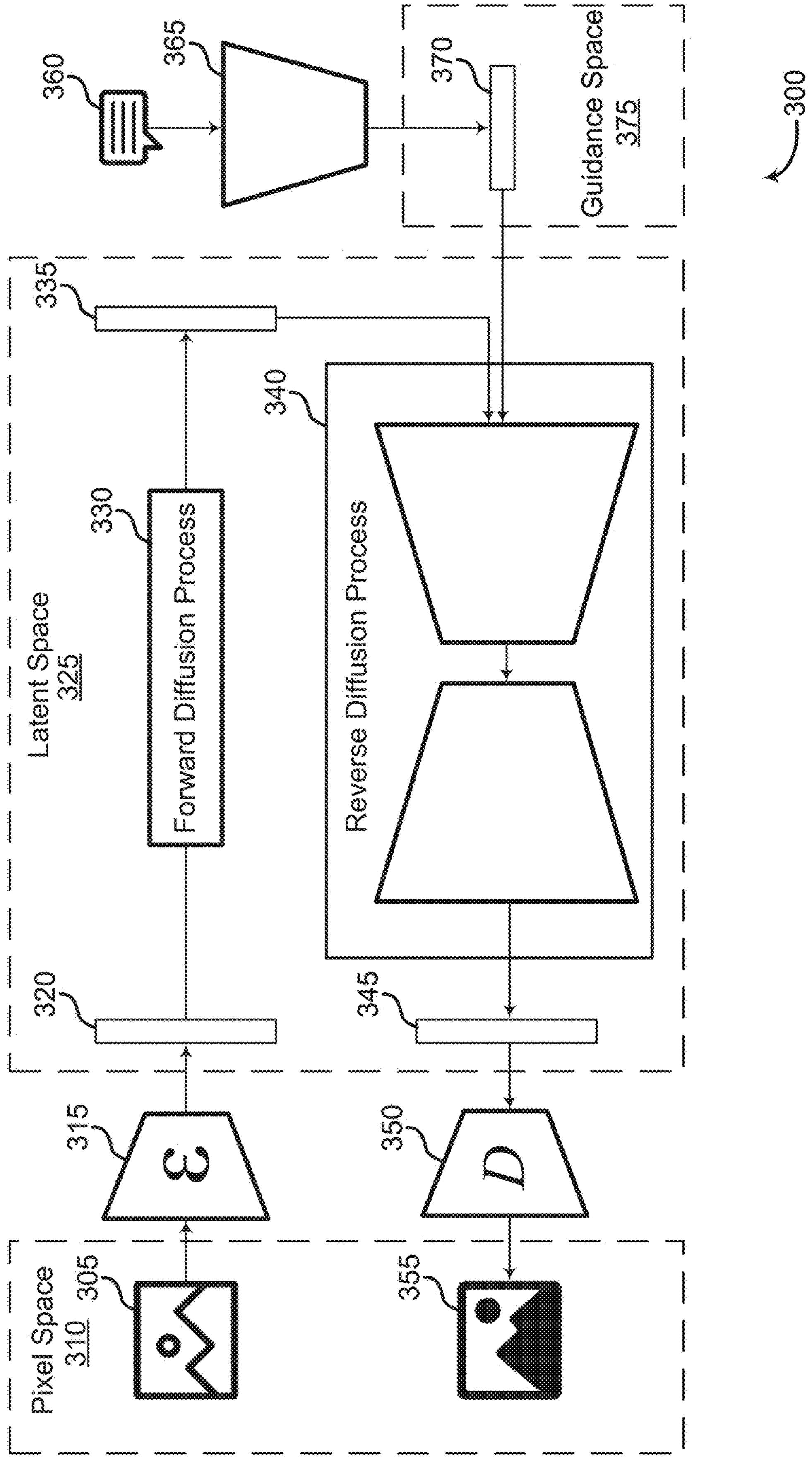
FIG. 3 shows an example of an image generation model according to aspects of the present disclosure.

FIG. 3 shows an example of an image generation model according to aspects of the present disclosure. The example shown includes diffusion neural network 300, original image 305, pixel space 310, image encoder 315, original image features 320, latent space 325, forward diffusion process 330, noisy features 335, reverse diffusion process 340, denoised image features 345, image decoder 350, output image 355, text prompt 360, text encoder 365, guidance features 370, and guidance space 375.

Forward diffusion process 330 is an example of, or includes aspects of, the corresponding element described with reference to FIG. 4. Text prompt 360 is an example of, or includes aspects of, the corresponding element described with reference to FIG. 6. Text encoder 365 is an example of, or includes aspects of, the corresponding element described with reference to FIGS. 2 and 6. Guidance features 370 is an example of, or includes aspects of, the corresponding element described with reference to FIG. 6.

The following will now describe the approach behind and the technical details of diffusion neural networks as generative models for producing images. The following description pertains to both multi-step diffusion models, as well as embodiments of the image generation model as described with reference to FIG. 2, which is a single-step generator. A gradient network including a pre-trained model and a jointly-trained model, will be described in further detail with reference to FIG. 4. Unlike the image generation model, the pre-trained model and the jointly-trained model may function by performing multi-step generation.

In some examples, diffusion models are based on a neural network architecture known as a U-Net. The U-Net takes input features having an initial resolution and an initial number of channels, and processes the input features using an initial neural network layer (e.g., a convolutional network layer) to produce intermediate features. The intermediate features are then down-sampled using a down-sampling layer such that down-sampled features have a resolution less than the initial resolution and a number of channels greater than the initial number of channels.

This process is repeated multiple times, and then the process is reversed. That is, the down-sampled features are up-sampled using up-sampling process to obtain up-sampled features. The up-sampled features can be combined with intermediate features having a same resolution and number of channels via a skip connection. These inputs are processed using a final neural network layer to produce output features. In some cases, the output features have the same resolution as the initial resolution and the same number of channels as the initial number of channels.

In some cases, a U-Net takes additional input features to produce conditionally generated output. For example, the additional input features could include a vector representation of an input prompt, such as a text prompt. The additional input features can be combined with the intermediate features within the neural network at one or more layers. For example, a cross-attention module can be used to combine the additional input features and the intermediate features.

A diffusion process may also be modified based on conditional guidance. In some cases, a user provides a text prompt describing content to be included in a generated image. For example, a user may provide the prompt "a person playing with a cat". In some examples, guidance can be provided in a form other than text, such as via an image, a sketch, or a layout. The system converts the text prompt (or other guidance) into a conditional guidance vector or other multi-dimensional representation. For example, text may be converted into a vector or a series of vectors using a transformer model, or a multi-modal encoder. In some cases, the encoder for the conditional guidance is trained independently of the diffusion model.

A noise map is initialized that includes random noise. The noise map may be in a pixel space or a latent space. By initializing an image with random noise, different variations of an image including the content described by the conditional guidance can be generated. Then, the system generates an image based on the noise map and the conditional guidance vector.

A diffusion process can include both a forward diffusion process for adding noise to an image (or features in a latent space) and a reverse diffusion process for denoising the images (or features) to obtain a denoised image. The forward diffusion process can be represented as $q(x_t|x_{t-1})$, and the reverse diffusion process can be represented as $p(x_{t-1}|x_t)$. In some cases, the forward diffusion process is used during training to generate images with successively greater noise, and a neural network is trained to perform the reverse diffusion process (i.e., to successively remove the noise).

In an example forward process for a latent diffusion model, the model maps an observed variable $x_0$ (either in a pixel space or a latent space) intermediate variables $x_1, \ldots, x_T$ using a Markov chain. The Markov chain gradually adds Gaussian noise to the data to obtain the approximate posterior $q(x_{1:T}|x_0)$ as the latent variables are passed through a neural network such as a U-Net, where $x_1, \ldots, x_T$ have the same dimensionality as $x_0$.

The neural network may be trained to perform the reverse process. During the reverse diffusion process, the model begins with noisy data $x_T$, such as a noisy image and denoises the data to obtain the $p(x_{t-1}|x_t)$. At each step t−1, the reverse diffusion process takes $x_t$, such as first intermediate image, and t as input. Here, t represents a step in the sequence of transitions associated with different noise levels. The reverse diffusion process outputs $x_{t-1}$, such as second intermediate image iteratively until $x_T$ is reverted back to $x_0$, the original image. The reverse process can be represented as:

$$p_\theta(x_{t-1} \mid x_t) := N\left(x_{t-1}; \mu_\theta(x_t, t), \sum\nolimits_\theta (x_t, t)\right). \quad (1)$$

The joint probability of a sequence of samples in the Markov chain can be written as a product of conditionals and the marginal probability:

$$x_T\colon\ p_\theta(x_{0:T}) := p(x_T)\prod\nolimits_{t=1}^{T} p_\theta(x_{t-1} \mid x_t), \quad (2)$$

where $p(x_T)=N(x_T; 0, I)$ is the pure noise distribution as the reverse process takes the outcome of the forward process, a sample of pure noise, as input and $$\prod\nolimits_{t=1}^{T} p_\theta(x_{t-1} \mid x_t)$$

represents a sequence of Gaussian transitions corresponding to a sequence of addition of Gaussian noise to the sample. In the image generation model of the present embodiments, there is only a single step to transform from pure noise to a fully denoised image.

At interference time, observed data $x_0$ in a pixel space can be mapped into a latent space as input and a generated data $\tilde{x}$ is mapped back into the pixel space from the latent space as output. In some examples, $x_0$ represents an original input image with low image quality, latent variables $x_1, \ldots, x_T$ represent noisy images, and $\tilde{x}$ represents the generated image with high image quality.

A diffusion model may be trained using both a forward and a reverse diffusion process. In one example, the user initializes an untrained model. Initialization can include defining the architecture of the model and establishing initial values for the model parameters. In some cases, the initialization can include defining hyper-parameters such as the number of layers, the resolution and channels of each layer blocks, the location of skip connections, and the like.

The system then adds noise to a training image using a forward diffusion process in N stages. In some cases, the forward diffusion process is a fixed process where Gaussian noise is successively added to an image. In latent diffusion models, the Gaussian noise may be successively added to features in a latent space.

At each stage n, starting with stage N, a reverse diffusion process is used to predict the image or image features at stage n−1. For example, the reverse diffusion process can predict the noise that was added by the forward diffusion process, and the predicted noise can be removed from the image to obtain the predicted image. In some cases, an original image is predicted at each stage of the training process.

The training system compares predicted image (or image features) at stage n−1 to an actual image (or image features), such as the image at stage n−1 or the original input image. For example, given observed data x, the diffusion model may be trained to minimize the variational upper bound of the negative log-likelihood $-\log p_\theta(x)$ of the training data. The training system then updates parameters of the model based on the comparison. For example, parameters of a U-Net may be updated using gradient descent. Time-dependent parameters of the Gaussian transitions can also be learned. During training, the image generation model of the present embodiments attempts to fully denoise the image or image features in one step, and the output after the single-step is evaluated to update parameters of the image generation model.

Figure 4:
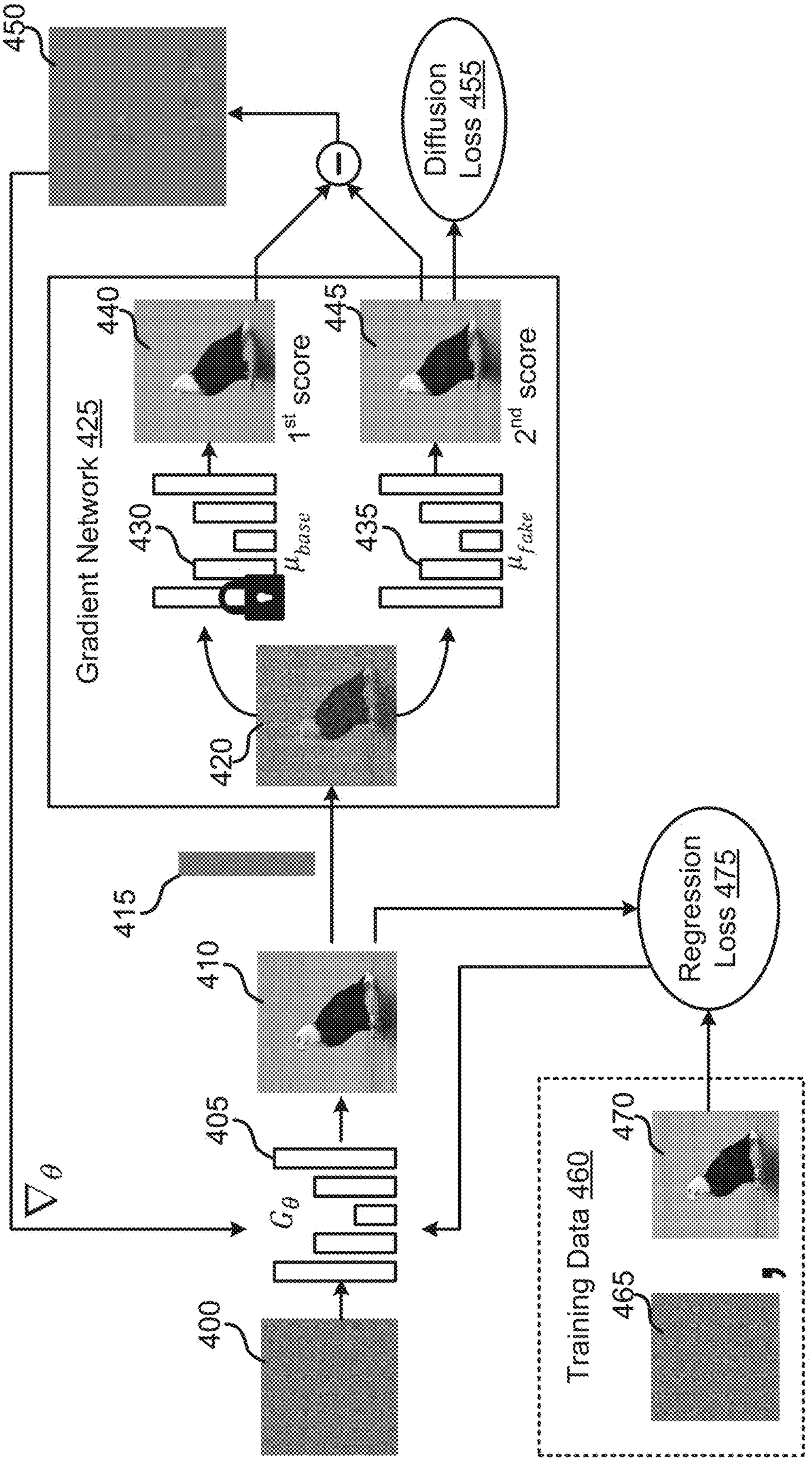
FIG. 4 shows an example of a training pipeline for an image generation model according to aspects of the present disclosure.

FIG. 4 shows an example of a training pipeline for an image generation model 405 according to aspects of the present disclosure. The example shown includes noise input 400, image generation model 405, predicted output 410, forward diffusion process 415, noisy image 420, gradient network 425, first score 440, second score 445, gradient term 450, diffusion loss 455, training data 460, and regression loss 475.

Image generation model 405 is an example of, or includes aspects of, the corresponding element described with reference to FIGS. 2 and 6. In this example, gradient network 425 includes pre-trained model 430 and jointly-trained model 435. Pre-trained model 430 and jointly-trained model 435 are examples of, or include aspects of, the diffusion neural network described with reference to FIG. 3.

As described above, conventional attempts at distilling the generative reverse diffusion process to a single step include reconstructing training samples from pure noise in a single step, and updating parameters of the neural network using a sample reconstruction loss. However, when generalized to reconstructing from noise samples outside of the training noise samples, including text-conditioned generation, the conventional neural networks tend to break and produce unrecognizable visual features. In contrast, present embodiments include a training process that teaches a student generator network to produce image samples in the same distribution as a parent network, rather than learn exact mappings to each image sample produced by the parent network. Generative Adversarial Networks (GANs) are inspired by a similar distribution-matching approach; however, GAN architectures are not stable to large training processes.

Training the Image Generation Model

A method for training an image generation model is described. One or more aspects of the method include initializing an image generation model; computing a multi-term loss comprising a positive term based on an output of a pre-trained model, and a negative term based on an output of a jointly-trained model; and training the image generation model to generate a synthetic image in a single pass based on the multi-term loss.

In some aspects, the magnitude of (i.e., the absolute value of) the positive term decreases with an increase in a difference between an output of the image generation model and an output of the pre-trained model, and the magnitude of (i.e., the absolute value of) the negative term decreases with an increase in a difference between the output of the image generation model and an output of the jointly-trained model. In some aspects, the multi-term loss causes the output of the image generation model to approach the output of the pre-trained model, and to diverge from the output of the jointly-trained model.

Some examples of the method, apparatus, non-transitory computer readable medium, and system further include training the jointly-trained model based on an output of the image generation model. Some further include creating a training set including a noise input and a training output. Some examples further include computing a regression loss based on the training output and an output of the image generation model, wherein the output of the image generation model is based on the noise input. Some examples of the method, apparatus, non-transitory computer readable medium, and system further include generating the training output based on the noise input using the pre-trained model. In some aspects, the image generation model is initialized using weights from the pre-trained model. In some aspects, the jointly-trained model is initialized using weights from the pre-trained model.

A training pipeline, such as the one described with reference to FIG. 4, distills a pre-trained diffusion denoiser $\mu_{base}$, pre-trained model 430, i.e., a parent network, into a fast one-step image generator $G_\theta$. The one-step image generator $G_\theta$, image generation model 405, is trained to produce high-quality images within the same distribution as the base model $\mu_{base}$, but without multi-step iteration procedure. In aligning with the terminology of GANs, the outputs of $G_\theta$ are denoted as "fake." $G_\theta$ is trained by minimizing a distribution matching objective, gradient term 450, that is the difference of two score functions first score 440 and second score 445. This process will now be described in detail.

Diffusion models are trained to reverse a Gaussian diffusion process that progressively adds noise to a sample from a real data distribution $x_0 \sim p_{real}$ to turn it into white noise $x_T \sim \mathcal{N}(0, I)$ over T time steps. According some aspects, pre-trained model 430 is used to generate training data 460 by starting from a training noise input 465 to produce training image output 470. However, it should be noted that some embodiments do not utilize training data 460, and instead train solely based on gradient term 450, to be described later.

In some embodiments, the one-step generator $G_\theta$ includes the same architecture as a base diffusion denoiser, e.g., a U-Net, but without the time-conditioning. In at least one embodiment, the parameters of the one-step generator $G_\theta$ are initialized to the parameters of $\mu_{base}$. During training, embodiments minimize the Kullback-Liebler (KL) divergence between the "real" distribution produced by the pre-trained model, the score of which is $\mu_{base}$, and the "fake" distribution, whose score is provided by the jointly-trained model, calculated for outputs from the untrained one-step generator $G_\theta$. This objective is given by Equation 3:

$$D_{KL}(p_{fake} \| p_{real}) = \mathop{\mathbb{E}}_{x \sim p_{fake}} \left( \log \frac{p_{fake}(x)}{p_{real}(x)} \right) = \mathop{\mathbb{E}}_{\substack{z \sim \mathcal{N}(0;I) \\ x = G_\theta(z)}} - (\log p_{real}(x) - \log p_{fake}(x)) \tag{3}$$

Where $p_{real}$ and $p_{fake}$ are the real and fake distributions, respectively. In some cases, computing the probability densities to estimate this loss is intractable; however, embodiments do not compute the probability densities directly. Instead, embodiments compute the gradient, i.e. gradient term 450, with respect to the parameters θ to train $G_\theta$ by gradient descent.

According to some aspects, the gradient term 450 is computed as a combination of scores. The score is defined as the gradient of the log probability at each step of noise addition. The score guides the model in reversing the noise addition to regenerate the data. Multi-step diffusion models such as pre-trained model 430 $\mu_{base}$ and jointly-trained model 435 $\mu_{fake}$ can be thought of as "score functions" that are configured to produce scores of the real and fake distributions for the denoising process using the output of one-step generator $G_\theta$. Taking the gradient of Eq. (3) with respect to the parameters θ of $G_\theta$ yields the following:

$$\nabla_\theta D_{KL} = \mathop{\mathbb{E}}_{\substack{z \sim \mathcal{N}(0;I) \\ x = G_\theta(z)}} [-(s_{real}(x) - s_{fake}(x)) \nabla_\theta G_\theta(z)] \tag{4}$$

where $s_{real}(x) = \nabla_x \log p_{real}(x)$ and $s_{fake}(x) = \nabla_x \log p_{fake}(x)$ are the scores of the respective distributions. The score $s_{real}$ represents a direction that moves x towards the mode(s) of $p_{real}$, and $-s_{fake}$ meanwhile is a direction that diverges x from the mode(s) of $p_{fake}$.

In some cases, embodiments perturb the output of one-step generator $G_\theta$ with noise using forward diffusion process 415 so as to create a family of "blurred" distributions that are fully supported over the ambient space, and therefore overlap, so that the gradient of Eq. (3) is well-defined. The addition of noise to output x produces diffused sample $x_t \sim q(x_t|x)$, e.g. noisy image 420, at diffusion time step t:

$$q_t(x_t \mid x) \sim \mathcal{N}(\alpha_t x; \sigma_t^2 I) \tag{5}$$

where $\alpha_t$ and $\sigma_t$ are from the diffusion noise schedule.

To compute the "real" score, first score 440, embodiments use the pre-trained diffusion denoiser $\mu_{base}$, also referred to as pre-trained model 430. The score as produced from a diffusion model is given by the following:

$$s_{real}(x_t, t) = -\frac{x_t - \alpha_t \mu_{base}(x_t, t)}{\sigma_t^2} \quad (6)$$

and similarly so for the "fake" score, second score 445:

$$s_{fake}(x_t, t) = -\frac{x_t - \alpha_t \mu_{fake}^{\phi}(x_t, t)}{\sigma_t^2} \quad (7)$$

It should be noted that the term of Eq. (7) includes a negation, and is added to the term of Eq. (6) to yield gradient term 450. However, it is also equivalent to not include the negation, and in this form, subtract $s_{fake}$ from $s_{real}$ to yield gradient term 450.

Since the one-step generator $G_\theta$ is actively updated through the backpropagation of gradient term 450, its output distribution is constantly changing. Accordingly, the second diffusion model $$\mu_{fake}{}^{\phi}$$

e.g., jointly-trained model 435, is dynamically adjusted to track these changes. In at least one embodiment, $$\mu_{fake}{}^{\phi}$$

is initialized from the pre-trained diffusion model $\mu_{base}$, and parameters of $$\mu_{fake}{}^{\phi}$$

are updated during training by minimizing a standard denoising objective, e.g., diffusion loss 455:

$$\mathcal{L}_{denoise}^{\phi} = \left\|\mu_{fake}^{\phi}(x_t, t) - x_0\right\|_2^2 \quad (8)$$

where $$\mathcal{L}_{denoise}^{\phi}$$

is weighted according to the diffusion timestep t. According to some aspects, the loss is weighted according to the same weighting strategy employed during the pre-training of $\mu_{base}$.

Accordingly, embodiments approximate the gradient term from Eq. (4) by combining the scores $s_{fake}$ and $s_{real}$ on the noise-added outputs from $G_\theta$ and take the expectation over the diffusion time steps:

$$\nabla_\theta D_{KL} \simeq \mathop{\mathbb{E}}_{z,t,x,x_t}\left[w_t \alpha_t (s_{fake}(x_t, t) - s_{real}(x_t, t)) \nabla_\theta G_\theta(z)\right] \quad (9)$$

where $z \sim \mathcal{N}(0, I)$, $x = G_\theta(z)$, $t \sim \mathcal{U}(T_{min}, T_{max})$, $x_t \sim q(x_t|x)$, and $w_t$ is a time-dependent scalar weight included to improve training stability. In some embodiments, $w_t$ is computed to normalize the gradient term's magnitude across different noise levels. For example, in one embodiment, $w_t$ is computed as the mean absolute error across spatial and channel dimensions between the denoised image and the input, like so:

$$w_t = \frac{\sigma_t^2}{\alpha_t} \frac{CS}{\|\mu_{base}(x_t, t) - x\|_1} \quad (10)$$

where S is the number of spatial locations and C is the number of channels.

Some embodiments further compute a regression loss 475. According to some aspects, the regularization loss can prevent issues during training such as mode collapse or mode dropping, in which the fake distribution assigns a higher overall density to a subset of the modes. In one embodiment, this regression loss is given by:

$$\mathcal{L}_{reg} = \mathop{\mathbb{E}}_{(z,y)\sim\mathcal{D}} \ell(G_\theta(z), y) \quad (11)$$

This regression loss captures the differences between the predicted output 410 of $G_\theta$ from training noise input 465, and training image output 470. Accordingly, embodiments that include the regression loss train $G_\theta$ on $\nabla_\theta D_{KL} + \mathcal{L}_{reg}$. In this way, embodiments train a one-step generator $G_\theta$ to match the output distribution of a multi-step, pre-trained parent network. According to some aspects, a training component is responsible for computing the various loss functions described above, by manipulating the outputs of $G_\theta$, $\mu_{fake}$, and $\mu_{real}$.

Figure 5:
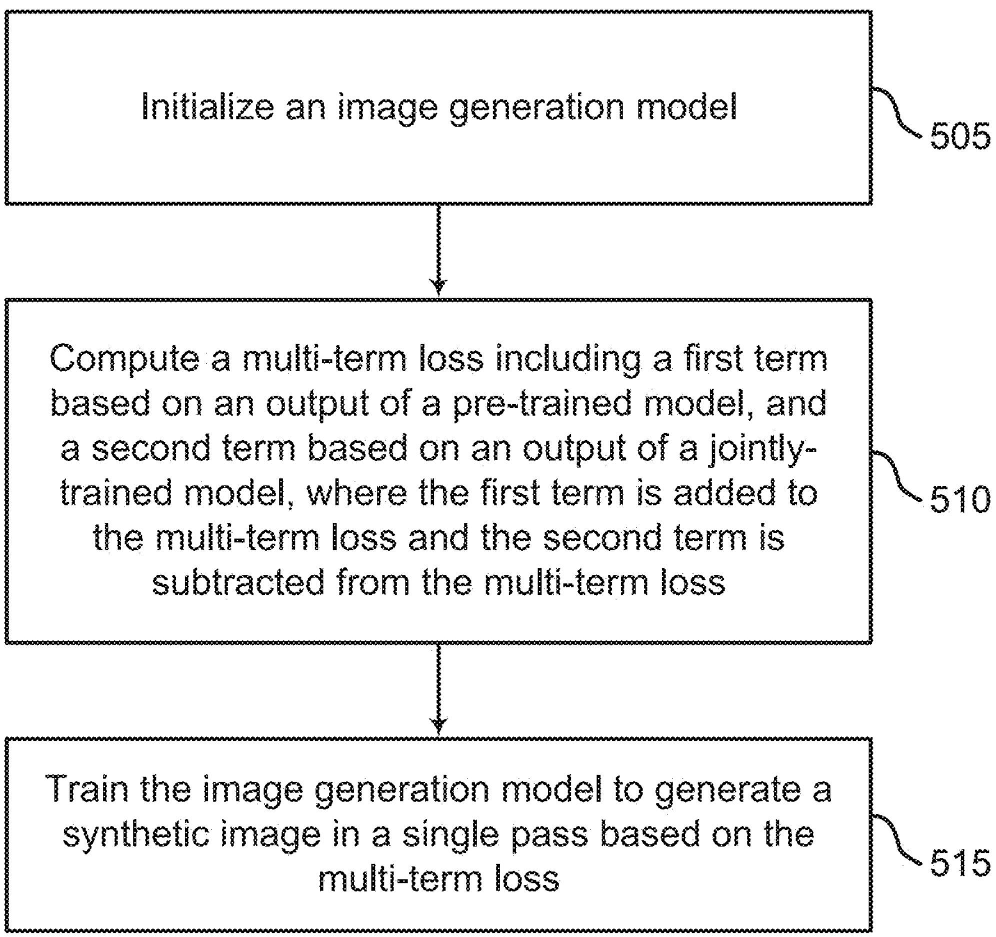
FIG. 5 shows an example of a method for training a machine learning model according to aspects of the present disclosure.

FIG. 5 shows an example of a method 500 for training a machine learning model according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 505, the system initializes an image generation model. In some cases, the operations of this step refer to, or may be performed by, an image generation apparatus as described with reference to FIGS. 1 and 2. For example, the system may initialize an image generation model based on a pre-trained model, as described in the training pipeline of FIG. 4. In some embodiments, the system may initialize the image generation model by initializing a U-Net network with zeroed-out parameters, or random parameters.

At operation 510, the system computes a multi-term loss including a first term based on an output of a pre-trained model, and a second term based on an output of a jointly-trained model, where the first term is added to the multi-term loss and the second term is subtracted from the multi-term loss. The first term may be referred to as a positive term, and the second term may be referred to as a negative term. In some cases, the operations of this step refer to, or may be performed by, a gradient network as described with reference to FIG. 4. The first term may be a score computed by the pre-trained model in a denoising process. For example, the image generation model may generate a predicted output image, then the system may add noise to the predicted output image. The pre-trained model will then de-noise this noise-added output and in the process, compute a score as described with reference to FIG. 4. Similarly, the jointly-trained model may compute another score based on its denoising process. In some embodiments, the multi-term loss includes the first term and the second term, and optionally includes a third term representing a regression loss. The regression loss quantifies a difference between the predicted output image of the image generation model and a training image.

At operation 515, the system trains the image generation model to generate a synthetic image in a single pass based on the multi-term loss. In some cases, the operations of this step refer to, or may be performed by, a training component as described with reference to FIG. 2. For example, the system may train the image generation model by updating parameters thereof according to a backpropagation of the multi-term loss.

Image Generation

A method for image generation is described. One or more aspects of the method include obtaining a noise input and performing a single pass with an image generation model to obtain a synthetic image based on the noise input, wherein the image generation model is trained based on a multi-term loss comprising a first term based on an output of a pre-trained model, and a second term based on an output of a jointly-trained model, wherein the first term is added to the multi-term loss and the second term is subtracted from the multi-term loss.

Some examples of the method, apparatus, non-transitory computer readable medium, and system further include obtaining a text prompt. Some examples further include generating guidance input for the image generation model based on the text prompt, wherein the synthetic image includes an element described by the text prompt. Some examples further include encoding the noise input to obtain a hidden representation comprising fewer dimensions than the noise input. Some examples further include decoding the hidden representation to obtain the synthetic image.

In some aspects, the first term decreases with an increase in a difference between an output of the image generation model and an output of the pre-trained model, and wherein the second term decreases with an increase in a difference between the output of the image generation model and an output of the jointly-trained model. In some aspects, the pre-trained model and the jointly-trained model comprise diffusion models.

Figure 6:
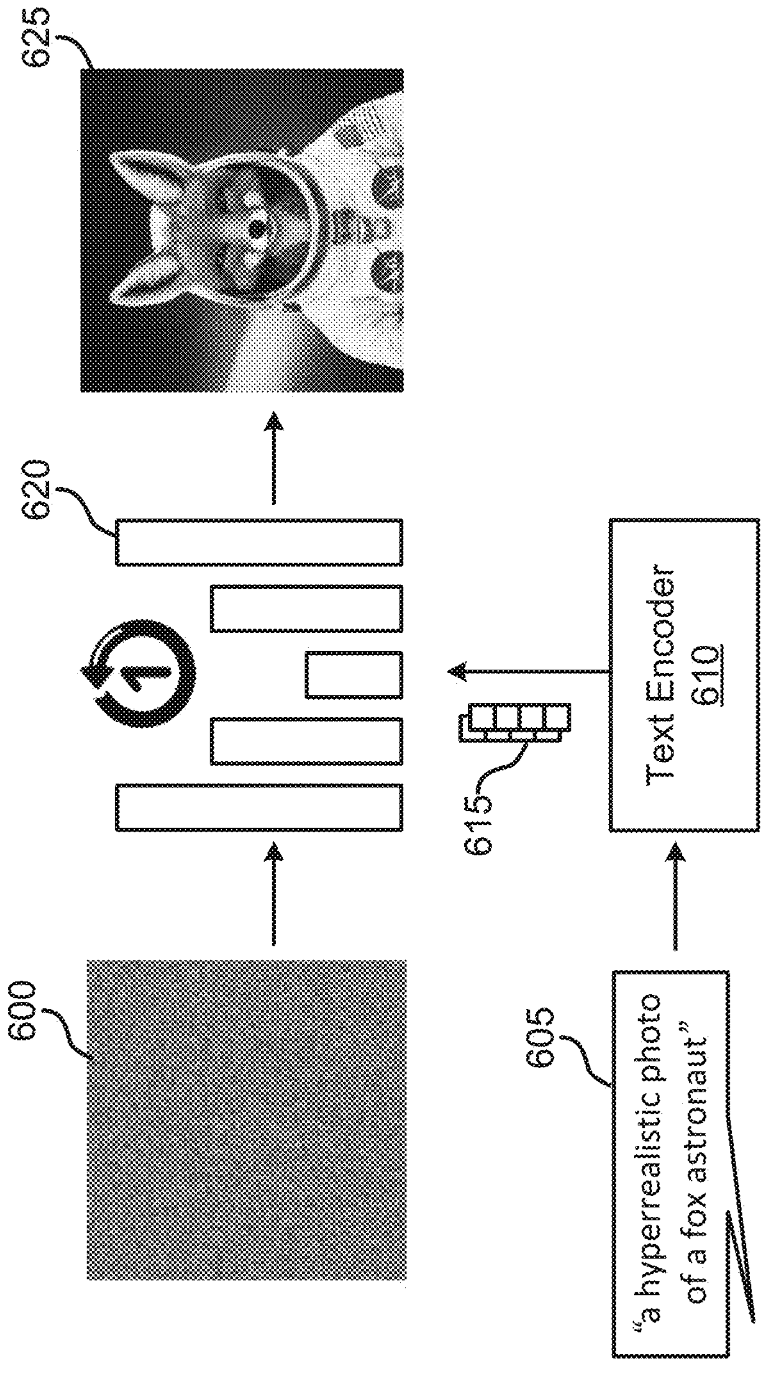
FIG. 6 shows an example of a pipeline for generating images according to aspects of the present disclosure.

FIG. 6 shows an example of a pipeline for generating images according to aspects of the present disclosure. The example shown includes noise input 600, text prompt 605, text encoder 610, guidance features 615, image generation model 620, and synthetic image 625. Text prompt 605 is an example of, or includes aspects of, the corresponding element described with reference to FIG. 3. Text encoder 610 is an example of, or includes aspects of, the corresponding element described with reference to FIGS. 2 and 3. Guidance features 615 is an example of, or includes aspects of, the corresponding element described with reference to FIG. 3. Image generation model 620 is an example of, or includes aspects of, the corresponding element described with reference to FIGS. 2 and 4.

FIG. 6 represents the use of the image generation model after training has been completed. In this example, the image generation model samples or generates a noise input 600. The noise input 600 may have the same dimensions as the output image, but is not necessarily limited thereto, and may be sampled from a different space. A user provides text prompt 605 prompt, e.g., via a user interface a described with reference to FIG. 2. A text encoder such as the one described with reference to FIG. 2 then encodes the text prompt to generate a text embedding. The text embedding is input as guidance features 615 to image generation model 620 to guide the generative reverse diffusion process. The incorporation of guidance features to the generation process is described with additional detail with reference to FIG. 3.

Using the noise input 600 and the guidance features 615, the image generation model 620 performs a reverse diffusion process to generate synthetic image 625. The reverse diffusion process is described in greater detail with reference to FIG. 3. The system may then provide synthetic image 625 to the user, e.g., via the user interface.

Figure 7:
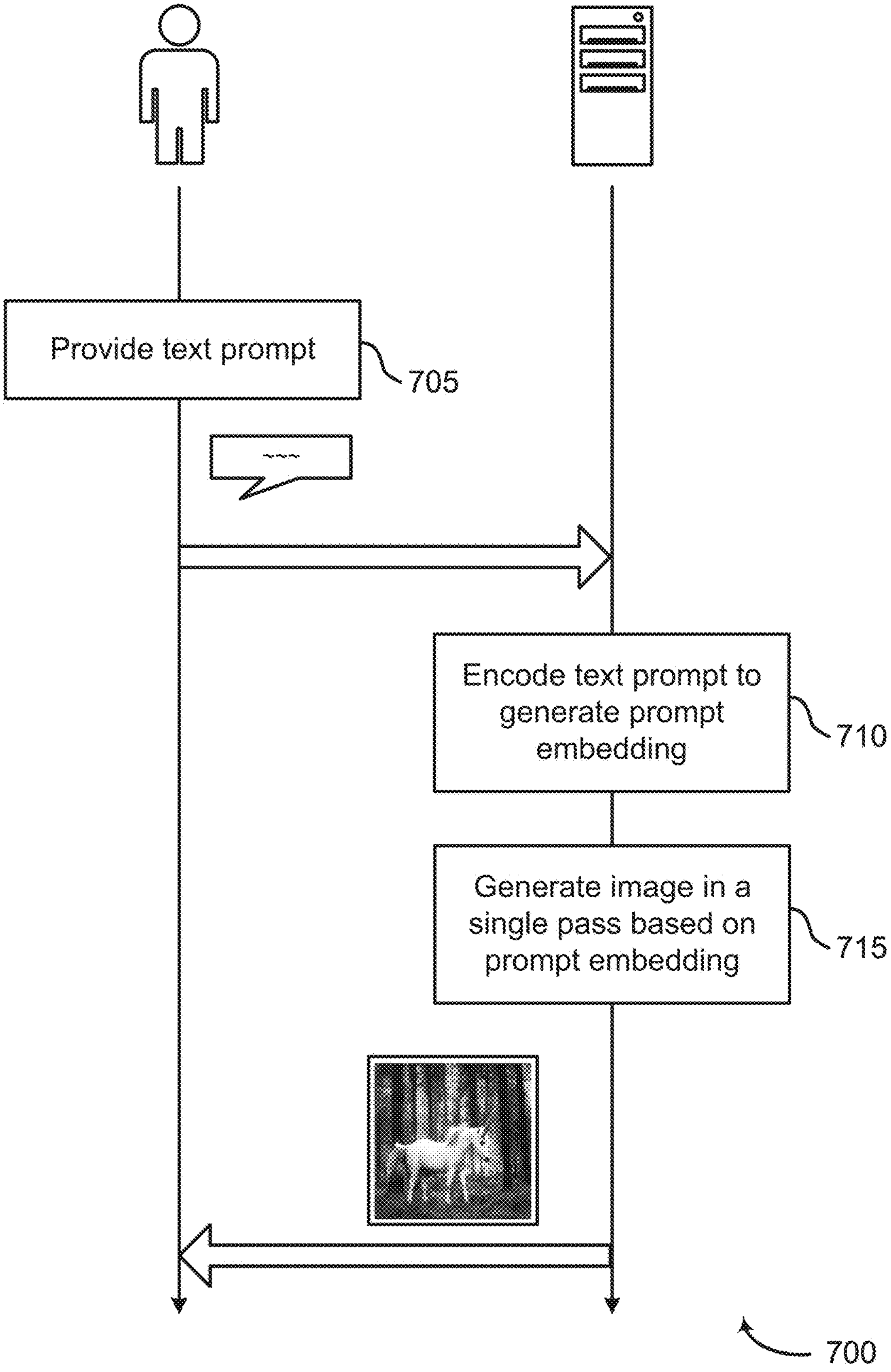
FIG. 7 shows an example of a method for synthesizing an image for a user according to aspects of the present disclosure.

FIG. 6 provides an example flow of information between components of an image generation system. FIG. 7 illustrates an example flow of information between the image generation system and the user, and shows an example of a method 700 for synthesizing an image for a user according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 705, a user provides a text prompt. The user may do so via, e.g., a user interface including a GUI. For example, the GUI may include a text field with a prompt for the user such as "Write a description of your desired image."

At operation 710, the system encodes the text prompt to generate a prompt embedding. The operations of this step refer to, or may be performed by, a text encoder as described with reference to FIG. 2. Embodiments of the text encoder include, but are not limited to, the text encoder from the CLIP neural network.

At operation 715, the system generates the image in a single pass based on the prompt embedding. For example, the system may generate the image using an image generation model as described with reference to FIGS. 3-4. The image generation model may be trained to generate images in a single iteration by backpropagating a multi-term loss according to the pipeline described in FIG. 3.

Figure 8:
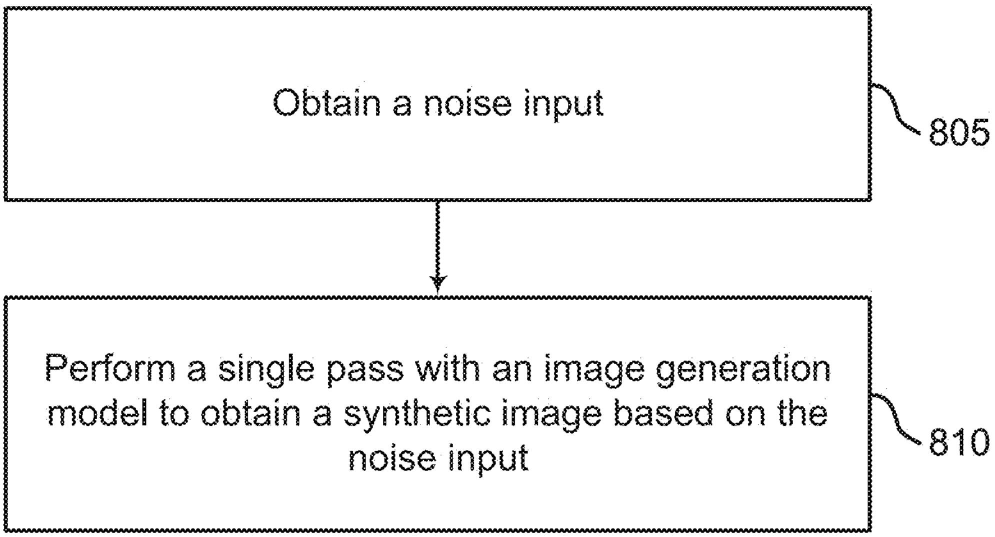
FIG. 8 shows an example of a method for one-step image generation according to aspects of the present disclosure.

FIG. 8 shows an example of a method 800 for one-step image generation according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 805, the system obtains a noise input. In some cases, the operations of this step refer to, or may be performed by, an image generation apparatus as described with reference to FIGS. 1 and 2. A noise input may be sampled from a noise distribution, such as a Gaussian distribution.

At operation 810, the system performs a single pass with an image generation model to obtain a synthetic image based on the noise input, where the image generation model is trained based on a multi-term loss including a first term based on an output of a pre-trained model, and a second term based on an output of a jointly-trained model, where the first term is added to the multi-term loss and the second term is subtracted from the multi-term loss. "Single pass" refers to a single generative iteration, standing in contrast with other generators which use multiple iterations to remove noise from a starting sample. The pre-trained model is a multi-step model and is considered a "parent" model. The first term represents a directional change towards the distribution of the parent model. The parent model's parameters are locked, and the model therefore retains its knowledge of realistic images acquired during pre-training throughout the training process of the image generation model. The jointly-trained model, in contrast, has unlocked parameters. Throughout the training of the one-step image generation model, the jointly-trained model learns to approximate the outputs from the latest version of the one-step image generation model. Its output, the "second term," represents a directional change towards its less-than-realistic distribution, sometimes referred to herein as a "fake" distribution. Therefore, the second term is subtracted from the first term to form a combined direction, the multi-term loss, that simultaneously guides the one-step image generation model towards the distribution of the parent model and away from the distribution of the jointly-trained model. In at least one embodiment, the image generation model is additionally trained on a regression loss that compares the outputs of the image generation model to training images produced by the pre-trained model.

Figure 9:
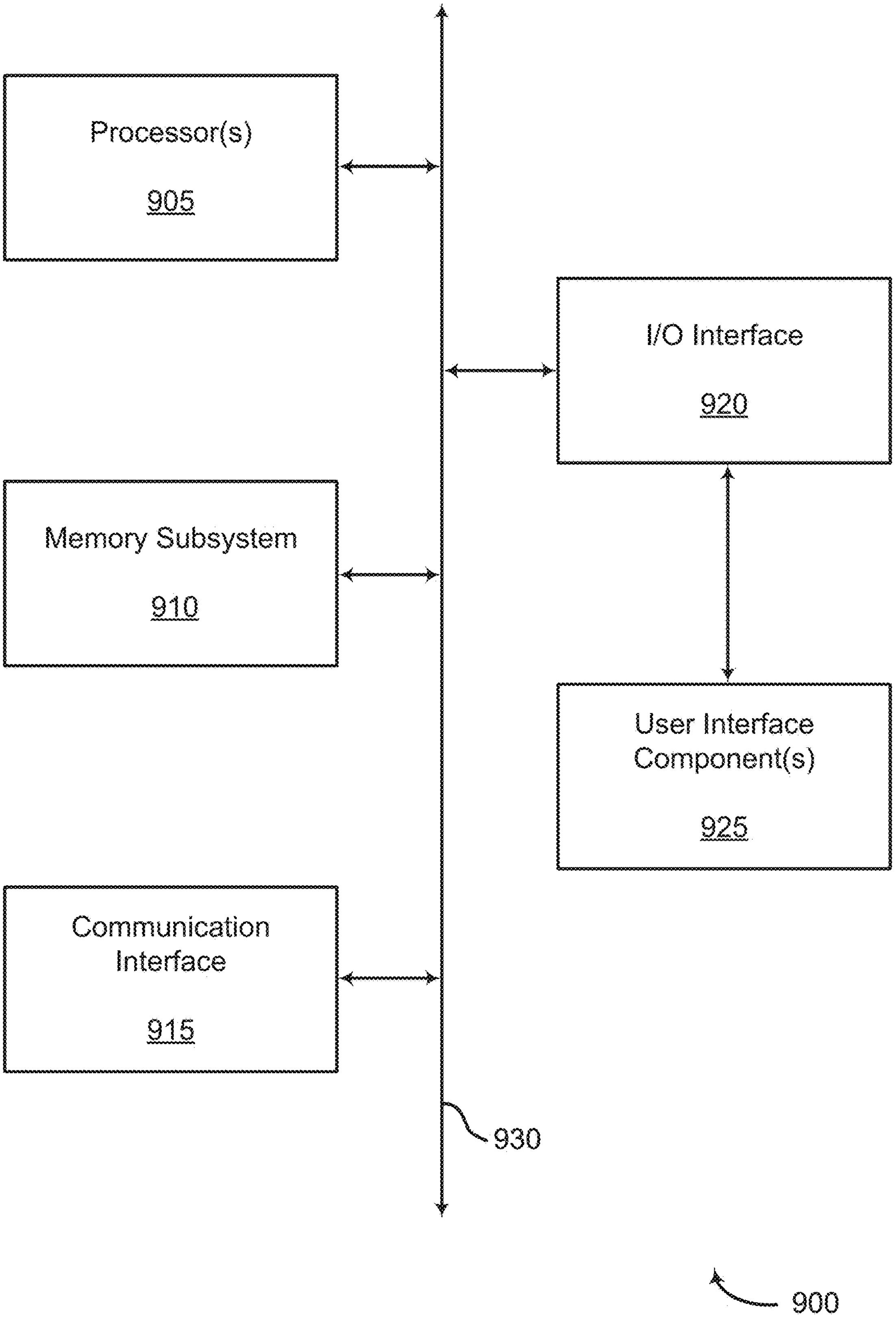
FIG. 9 shows an example of a computing device according to aspects of the present disclosure.

FIG. 9 shows an example of a computing device 900 according to aspects of the present disclosure. The example shown includes computing device 900, processor(s), memory subsystem 910, communication interface 915, I/O interface 920, user interface component(s), and channel 930.

In some embodiments, computing device 900 is an example of, or includes aspects of, the image generation apparatus 100 of FIG. 1. In some embodiments, computing device 900 includes one or more processors 905 that can execute instructions stored in memory subsystem 910 to obtain a noise input; and perform a single pass with an image generation model to obtain a synthetic image based on the noise input, wherein the image generation model is trained based on a multi-term loss comprising a first term based on an output of a pre-trained model, and a second term based on an output of a jointly-trained model, wherein the first term is added to the multi-term loss and the second term is subtracted from the multi-term loss.

According to some aspects, computing device 900 includes one or more processors 905. In some cases, a processor is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or a combination thereof. In some cases, a processor is configured to operate a memory array using a memory controller. In other cases, a memory controller is integrated into a processor. In some cases, a processor is configured to execute computer-readable instructions stored in a memory to perform various functions. In some embodiments, a processor includes special purpose components for modem processing, baseband processing, digital signal processing, or transmission processing.

According to some aspects, memory subsystem 910 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

According to some aspects, communication interface 915 operates at a boundary between communicating entities (such as computing device 900, one or more user devices, a cloud, and one or more databases) and channel 930 and can record and process communications. In some cases, communication interface 915 is provided to enable a processing system coupled to a transceiver (e.g., a transmitter and/or a receiver). In some examples, the transceiver is configured to transmit (or send) and receive signals for a communications device via an antenna.

According to some aspects, I/O interface 920 is controlled by an I/O controller to manage input and output signals for computing device 900. In some cases, I/O interface 920 manages peripherals not integrated into computing device 900. In some cases, I/O interface 920 represents a physical connection or port to an external peripheral. In some cases, the I/O controller uses an operating system such as iOS®, ANDROID®, MS-DOS®, MS-WINDOWS®, OS/2®, UNIX®, LINUX®, or other known operating system. In some cases, the I/O controller represents or interacts with a modem, a keyboard, a mouse, a touchscreen, or a similar device. In some cases, the I/O controller is implemented as a component of a processor. In some cases, a user interacts with a device via I/O interface 920 or via hardware components controlled by the I/O controller.

According to some aspects, user interface component(s) 925 enable a user to interact with computing device 900. In some cases, user interface component(s) 925 include an audio device, such as an external speaker system, an external display device such as a display screen, an input device (e.g., a remote control device interfaced with a user interface directly or through the I/O controller), or a combination thereof. In some cases, user interface component(s) 925 include a GUI.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:

obtaining a text prompt and a noise input; and generating, using an image generation model, a synthetic image based on the text prompt and the noise input by performing a single pass with the image generation model, wherein the image generation model is trained based on a multi-term loss comprising a positive term and a negative term, wherein the positive term is based on a difference between a diffusion output of the image generation model and a diffusion output of a pre-trained model, and wherein the negative term is based on a difference between a diffusion output of the image generation model and a diffusion output of a jointly-trained model different from the image generation model and the pre-trained model.

2. The method of claim 1, further comprising:

generating guidance input for the image generation model based on the text prompt, wherein the synthetic image includes an element described by the text prompt.

3. The method of claim 1, wherein performing the single pass comprises:

encoding the noise input to obtain a hidden representation comprising fewer dimensions than the noise input; and decoding the hidden representation to obtain the synthetic image.

4. The method of claim 1, wherein:

a magnitude of the positive term decreases with an increase in a difference between the diffusion output of the image generation model and the diffusion output of the pre-trained model, and wherein a magnitude of the negative term decreases with an increase in a difference between the diffusion output of the image generation model and the diffusion output of the jointly-trained model.

5. The method of claim 1, wherein:

the pre-trained model and the jointly-trained model comprise diffusion models.

6. A method of training a machine learning model, comprising:

initializing an image generation model;

computing a multi-term loss comprising a positive term and a negative term, wherein the positive term is based on a difference between a diffusion output of the image generation model and a diffusion output of a pre-trained model, and wherein the negative term is based on a difference between a diffusion output of the image generation model and a diffusion output of a jointly-trained model different from the image generation model and the pre-trained model; and training the image generation model to generate a synthetic image in a single pass based on the multi-term loss.

7. The method of claim 6, wherein:

a magnitude of the positive term decreases with an increase in a difference between the diffusion output of the image generation model and the diffusion output of the pre-trained model, and wherein a magnitude of the negative term decreases with an increase in a difference between the diffusion output of the image generation model and the diffusion output of the jointly-trained model.

8. The method of claim 6, wherein:

the multi-term loss causes the output of the image generation model to approach the output of the pre-trained model, and to diverge from the output of the jointly-trained model.

9. The method of claim 6, further comprising:

training the jointly-trained model based on the diffusion output of the image generation model.

10. The method of claim 6, further comprising:

creating a training set including a noise input and a training output; and computing a regression loss based on the training output and an output of the image generation model, wherein the output of the image generation model is based on the noise input.

11. The method of claim 10, wherein creating the training set comprises:

generating the training output based on the noise input using the pre-trained model.

12. The method of claim 6, wherein:

the image generation model is initialized using weights from the pre-trained model.

13. The method of claim 6, wherein:

the jointly-trained model is initialized using weights from the pre-trained model.

14. An apparatus comprising:

at least one processor;

at least one memory storing instructions executable by the at least one processor; and the apparatus further comprising an image generation model comprising parameters stored in the at least one memory and trained to perform a single pass to obtain a synthetic image based on a noise input, wherein the image generation model is trained based on a multi-term loss comprising a positive term and a negative term, wherein the positive term is based on a difference between a diffusion output of the image generation model and a diffusion output of a pre-trained model, and wherein the negative term is based on a difference between a diffusion output of the image generation model and a diffusion output of a jointly-trained model different from the image generation model and the pre-trained model.

15. The apparatus of claim 14, further comprising:

a text encoder configured to generating guidance input for the image generation model based on a text prompt, wherein the synthetic image includes an element based on the text prompt.

16. The apparatus of claim 14, wherein:

the image generation model comprises a U-Net architecture.

17. The apparatus of claim 14, wherein:

the pre-trained model comprises a diffusion model.

18. The apparatus of claim 14, wherein:

the jointly-trained model comprises a diffusion model.

19. The apparatus of claim 14, wherein:

the image generation model is initialized using weights from the pre-trained model.

20. The apparatus of claim 14, wherein:

the jointly-trained model is initialized using weights from the pre-trained model.

* * * * *